United States Patent
Ohyama

(10) Patent No.: US 8,176,387 B2
(45) Date of Patent: May 8, 2012

(54) ERROR DETECTION CONTROL SYSTEM

(75) Inventor: Shigeo Ohyama, Osaka (JP)

(73) Assignee: Sharp Kabushiki Kaisha, Osaka-shi (JP)

(*) Notice: Subject to any disclaimer, the term of this patent is extended or adjusted under 35 U.S.C. 154(b) by 364 days.

(21) Appl. No.: 12/594,311

(22) PCT Filed: Mar. 13, 2008

(86) PCT No.: PCT/JP2008/054570
§ 371 (c)(1),
(2), (4) Date: Oct. 1, 2009

(87) PCT Pub. No.: WO2008/126609
PCT Pub. Date: Oct. 23, 2008

(65) Prior Publication Data
US 2010/0083050 A1    Apr. 1, 2010

(30) Foreign Application Priority Data
Apr. 4, 2007    (JP) ................. 2007-098800

(51) Int. Cl.
*G11C 29/00* (2006.01)
*G06F 11/00* (2006.01)
*H03M 13/00* (2006.01)

(52) U.S. Cl. ............. 714/763; 714/42; 714/48; 714/718; 714/768; 714/774; 365/200; 365/201

(58) Field of Classification Search .......... 714/763, 714/42, 48, 718, 768, 774; 365/200, 201
See application file for complete search history.

(56) References Cited

U.S. PATENT DOCUMENTS

| | | | | |
|---|---|---|---|---|
| 4,019,033 A | * | 4/1977 | Parmet | 714/805 |
| 6,131,177 A | * | 10/2000 | Takeuchi et al. | 714/767 |
| 6,145,055 A | * | 11/2000 | Fujimoto | 711/128 |
| 6,237,110 B1 | * | 5/2001 | Lin et al. | 714/6.32 |
| 2002/0032891 A1 | | 3/2002 | Yada et al. | |
| 2003/0046631 A1 | | 3/2003 | Gappisch et al. | |
| 2005/0281113 A1 | | 12/2005 | Yada et al. | |

FOREIGN PATENT DOCUMENTS

| | | |
|---|---|---|
| JP | 1-209552 | 8/1989 |
| JP | 2002-91831 | 3/2002 |
| JP | 2004-524636 | 8/2004 |
| WO | WO-02/086719 | 10/2002 |

* cited by examiner

Primary Examiner — John J Tabone, Jr.
(74) Attorney, Agent, or Firm — Morrison & Foerster LLP

(57) ABSTRACT

An error detection control system for a nonvolatile memory comprises: a nonvolatile memory having data areas for a plurality of addresses each including a main data area and a redundant data area for one address; memory control means for controlling on the nonvolatile memory a batch erasing process on a data area group basis, a reading process on the data area basis, a programming process on the data area basis, and an overwriting process on a bit basis; error detecting means for executing the error detecting process based upon the corresponding redundant data; error detecting control means for controlling availability of execution of the error detecting process based upon data types to be classified depending on whether or not the data is subjected to the overwriting process or a storage state indicating whether or not the overwriting process has been executed.

9 Claims, 11 Drawing Sheets

PRIOR ART
FIG. 11A
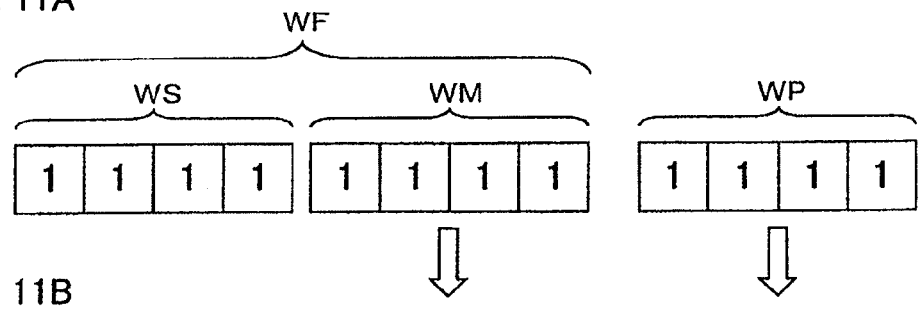
FIG. 11B
FIG. 11C
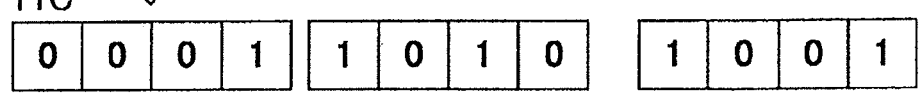

ERROR DETECTION CONTROL SYSTEM

CROSS-REFERENCE TO RELATED APPLICATIONS

This application is a National Phase filing under 35 U.S.C. §371 of International Application No. PCT/JP2008/054570 filed on Mar. 13, 2008, and which claims priority to Japanese Patent Application No. 2007-098800 filed on Apr. 4, 2007.

TECHNICAL FIELD

The present invention relates to an error detection control system for a semiconductor device provided with a nonvolatile memory, and more particularly concerns an error detection control system including a nonvolatile memory provided with data areas for a plurality of addresses each configured by a main data area and a redundant data area, memory control means for controlling to the nonvolatile memory a batch erasing process on a data area group basis, a reading process on a data area basis, a programming process on the data area basis and an overwriting process on a bit basis, and error detection means for executing an error detecting process on the read-out data based upon the corresponding redundant data.

BACKGROUND ART

Conventionally, for example, in a semiconductor device with a nonvolatile memory such as a flash memory installed therein, various techniques have been proposed so as to ensure data reliability and an anti-tampering characteristic against unfair data alteration and the like to be conducted so as to read out secret information such as electronic certification information and passwords.

The techniques for ensuring the data reliability and anti-tampering characteristic include, for example, an error detection technique in which error detecting codes such as parity codes and checksums are generated based upon each bit structure of data and an error detecting process is carried out by using the error detection codes, and an error detection and correction technique in which error detection and correction codes such as hamming codes are generated and an error detecting process and an error correcting process are carried out by using the error detection and correction codes.

More specifically, in the error detecting technique by using error detection codes, for example, a flash memory is configured so as to have data areas corresponding to a plurality of addresses, each composed of a main data area for storing predetermined data for each address and a redundant data area for storing redundant data used for error detecting processes of the data. In a programming process, an error detection code is generated based upon each of bit structures of programming data, and the programming data is programmed in the main data area, with necessary information being programmed in the redundant data area. Moreover, in a reading process, read-out data is read from the flash memory together with the corresponding redundant data so that, by using the redundant data, an error detecting process for detecting an error of the read-out data is carried out. In the error detection and correction technique by use of the error detection and correction codes, error detection and correction codes are generated based upon the respective bit structures of the programming data in a programming process, and when an error is detected in an error detecting process carried out in a reading process, the error correcting process is carried out.

The error detecting process in the error detecting technique is effectively used, for example, in the case when read-out data from the flash memory is falsely altered by, for example, applying noise to the power supply, so as to detect the alteration of the data and to ensure the anti-tampering characteristic. Moreover, the error correcting process in the error detection and correction process in the error detection and correction technique is effectively used for ensuring the reliability of data since for example, even in the case when data stored in a memory for a long period of time is aged to deteriorate, causing a failure in reading or the like, the data can be corrected.

In the case, upon programming data, on principle, the flash memory writes a value from '1' corresponding to an erased state to '0' corresponding to a programmed state on the bit basis; however, it cannot write a value from '0' corresponding to the programmed state to '1' corresponding to the erased state on the bit basis. More specifically, when the value is to be switched from the programmed state '0' to the erased state '1', an erasing process is carried out; however, the erasing process is carried out through a batch process on a memory block basis composed of, for example, a data area having a predetermined number of addresses. That is, in the erasing process, all the values of bits within a memory block to be erased are erased from '0' to '1', with the result that the value cannot be changed from '0' to '1' on the bit basis.

For this reason, in the case when, for example, data is composed of command data (command codes), once data has been programmed, the erasing process is always executed prior to a programming process for programming the next command code. In contrast, in the case when data is successively changing data, such as program counter data, from the viewpoint of a higher speed in the processing speed, in some cases, a structure is prepared in which the erasing process is not executed for every data programming process, but, after repeating overwriting processes for writing values in the main data area within the data area from '1' to '0' on the bit basis a fixed number of times after the programming process, an erasing process is executed.

In the case of a structure in which redundant data is added for error detection codes, error detection and correction codes and the like, since the error detection codes and the error detection and correction codes are formed in accordance with the bit structure of data stored in the main data area, the redundant data needs to be written when the overwriting process is executed on the main data area on the bit basis. However, as described above, in the flash memory, the writing process from '0' to '1' on the bit basis cannot be carried out; therefore, when an overwriting process is carried out on data, in some cases, it becomes impossible to write redundant data correctly. For this reason, in a conventional semiconductor device provided with a flash memory, it has been impossible to simultaneously provide an error detecting process effective from the viewpoints of data reliability and anti-tampering characteristic and an overwriting process effective from the viewpoint of a high processing speed.

As a technique for simultaneously providing the error detecting process and the overwriting process, for example, an error detecting technique has been proposed in which each of data areas in a flash memory is formed by a main data area, a redundant data area for storing redundant data, and a status area, and, after an erasing process for the entire data area and a programming process of the main data area and the redundant data area have been executed, data that requires no change in the main data area and the redundant data area is programmed in the status area as a so-called overwriting process (for example, see Patent Document 1).

FIG. 11 shows an example of a transition of a value in the data area derived from the error detecting technique described in Patent Document 1. The data area in this case is composed of a 4-bit status area WS, a 4-bit main data area WM and a 4-bit redundant data area WP, and data used for error detection and correction codes relative to an 8-bit area WF composed of the status area WS and the main data area WM is stored in the redundant data area WP.

More specifically, FIG. 11A shows a data area after an erasing process, and all the values of the bits in the data area are set to '1'. FIG. 11B shows values in the data area after the first programming process has been executed following the erasing process. In this example of the programming process, a value '1010' is programmed in the main data area WM, and a value '1001' is programmed in the redundant data area WP. As described earlier, the value '1001' programmed in the redundant data area WP forms an error detection and correction code for the value '11111010' of the 8-bit area WF.

FIG. 11C shows values in the data area after a so-called overwriting process (after single-bit alteration). In this so-called overwriting process, a value '0001' is programmed in the status area WS. In this case, the value of the 8-bit area WF becomes '00011010', and the value of the error detection and correction code for this value is set to '1001'. Since this value is equal to the value '1001' of the redundant data area WP, it is found that, after the so-called overwriting process, by using the redundant data '1001' stored in the redundant data area WP, an error detecting process can be carried out on the data '00011010' stored in the 8-bit area WF composed of the status area WS and the main data area WM after the so-called overwriting process.

Patent Document 1: Japanese Patent Application National Publication (Laid-Open) No. 2004-524636

DISCLOSURE OF THE INVENTION

In the error detecting technique disclosed in Patent Document 1, however, it is necessary to program data that is consistent with the values already programmed in the main data area WM and the redundant data area WP, in the status area WS, with the result that the values of data to be programmed in the status area WS are limited. More specifically, in the example shown in FIG. 11, in addition to the above-mentioned value '0001', only the value '0100' can be programmed in the status area WS. For this reason, the application of the status area WS is extremely limited, for example, to such a case in which, in mobile communication, contents data is downloaded, and when the contents become invalid, an invalid mark '0001' indicating that the data is invalid is programmed in the status area WS. Moreover, in the error detecting technique described in Patent Document 1, the value to be programmed in the status area WS is limited, and since it is difficult to execute so-called overwriting processes a plurality of times, this technique is not suitable for use in data on which, like the aforementioned program counter data, overwriting processes of a plurality of times are preferably carried out.

Moreover, in the error detecting technique described in Patent Document 1, since it is necessary to program data that is consistent with the values already programmed in the main data area WM and the redundant data area WP in the status area WS, the circuit used for forming the value to be programmed in the status area WS tends to have a complex circuit structure.

Furthermore, in the error detecting technique described in Patent Document 1, the status area WS having a number of bits that correspond to the number of bits in the main data area WM needs to be prepared, and since redundant data is formed so as to include this status area WS, the number of bits in the redundant data area WP for storing redundant data needs to be increased. That is, as these areas increase, the amount of data required for the data area increases to cause the necessity of having to increase the storage area in the flash memory by a corresponding amount.

In view of the above-mentioned problems, the present invention has been devised, and an object thereof is to provide an error detection control system for a nonvolatile memory, which can execute an overwriting process in accordance with characteristics and states of data, without making the sequence of the error detecting processes and the circuit structure complicated, while maintaining a certain degree of data reliability and anti-tampering characteristic.

In order to achieve the above-mentioned object, in a first aspect of the present invention, an error detection control system comprises: a nonvolatile memory having data areas for a plurality of addresses, the data areas each including a main data area for storing predetermined data and a redundant data area for storing redundant data to be used in an error detecting process on the data; memory control means for controlling on the nonvolatile memory a batch erasing process on a data area group basis, the data area group including the data areas of a predetermined number of addresses, a reading process on the data area basis, a programming process on the data area basis, and an overwriting process on the main data area after the programming process on a bit basis, the bit constituting the main data area; and error detecting means for executing the error detecting process on read-out data in the reading process, based upon the corresponding redundant data, and the error detection control system further comprises: error detecting control means for controlling availability of execution of the error detecting process on the read-out data by the error detecting means, based upon data types to be classified depending on whether or not the read-out data is subjected to the overwriting process or a storage state indicating whether or not the overwriting process has been executed.

In a second aspect of the present invention, in the nonvolatile memory of the error detection control system in accordance with the above aspect, the nonvolatile memory is configured such that each of the data areas is set to an error detection process inhibit data area for storing the data on which the execution of the error detecting process is inhibited or an error detection process permit data area for storing the data on which the execution of the error detecting process is permitted, and the error detecting control means inhibits the error detection means from executing the error detecting process during the reading process when a reading object data area to be subjected to the reading process corresponds to the error detecting process inhibit data area, and permits the error detection means to execute the error detecting process during the reading process when the reading object data area corresponds to the error detecting process permit data area.

In a third aspect of the present invention, in the error detection control system in accordance with the first aspect of the present invention, the memory control means outputs an error detection control signal to the error detection control means in the reading process in accordance with the data type of the read-out data in the reading process, the error detection control means determines whether or not the data type of the read-out data corresponds to a data type allowing the overwriting process to be executed based upon the error detection control signal in the reading process, permits the error detection means to execute the error detecting process when the data type corresponds to a data type not allowing the overwriting process to be executed, and inhibits the error detection means from executing the error detecting process when the data type corresponds to a data type allowing the overwriting process to be executed, and the error detection means executes the error detecting process on the read-out data by using the corresponding redundant data when the execution of the error detecting process on the read-out data is permitted by the error detection control means.

In a fourth aspect of the present invention, in the error detection control system in accordance with the above-mentioned aspect of the present invention, when the error detection control signal is a signal indicating that the read-out data corresponds to command data, the error detection control means permits the execution of the error detecting process, and when the error detection control signal is a signal indicating that the read-out data corresponds to a program counter value, the error detection control means inhibits the execution of the error detecting process.

In a fifth aspect of the present invention, in the error detection control system in accordance with the first aspect of the present invention, the nonvolatile memory comprises a flag area for storing the availability of the execution of the error detecting process for each of the data areas, and the error detection control means sets an execution inhibit flag for the error detecting process in the flag area corresponding to the data area to be subjected to be the overwriting process when the memory control means carries out the overwriting process.

In a sixth aspect of the present invention, the error detection control system in accordance with the first aspect of the present invention comprises a register capable of storing the availability of the execution of the error detecting process for each of the data areas outside the nonvolatile memory, wherein the error detection control means sets in the register an execution inhibit flag for the error detecting process on the data area to be subjected to be the overwriting process when the memory control means carries out the overwriting process.

In a seventh aspect of the present invention, in the error detection control system in accordance with any one of the above-mentioned aspects, the memory control means carries out the reading process on an error detection inhibit data on which the execution of the error detecting process is inhibited, and then further carries out the reading process on the error detection inhibit data a predetermined number of times, and the error detection control means compares respective readout data in the reading process and determines whether the read-out data is correct or incorrect.

In an eighth aspect of the error detection control system in accordance with any one of the above-mentioned aspects of the present invention, the redundant data is designed to be applicable to an error correcting process in addition to the error detecting process, the error detection means executes the error detecting process and the error correcting process on the read-out data based upon the corresponding redundant data, and the error detection control means inhibits execution of the error correcting process when it inhibits the execution of the error detecting process.

In order to achieve the above-mentioned object, an IC card in accordance with the present invention is characterized by comprising an IC chip in which the error detection control system in accordance with any one of the aforementioned aspects is installed.

In accordance with the error detection control system of the above-mentioned aspect, since an error detection control device, which controls the availability of an error detecting process, based upon the data types to be classified depending on whether or not the read-out data is the execution object of the overwriting process or the storage state indicating whether or not the overwriting process has been executed, is installed, the error detecting process is executed on the read-out data not to be subjected to the overwriting process or not to have been subjected to the overwriting process so that the data reliability and anti-tampering characteristic can be desirably maintained, and the execution of the overwriting process can be carried out on read-out data to be desirably subjected to the overwriting process or to have been subjected to the overwriting process so that it becomes possible to achieve a high speed data processing. That is, in accordance with the error detection control system of the above-mentioned aspect, a semiconductor device provided with a nonvolatile memory is allowed to simultaneously have an effective error detecting process from the viewpoints of the data reliability and anti-tampering characteristic and an effective overwriting process from the view point of the high-speed data processing, and is also allowed to carry out an optimal process automatically in accordance with the data types and the storage state.

Moreover, in accordance with the error detection control system of the second aspect, since the availability of the overwriting process is controlled by setting the data area of the nonvolatile memory to one of the error detecting process inhibit data area and the error detecting process permit data area the sequence of processes for the setting of the availability of the overwriting process and the circuit structure are prevented from becoming complex so that the error detection control system of the second aspect can be achieved by a simple structure. Moreover, the sequence of processes of the programming process of the error detection control system of the second aspect is made smaller in its changes from the sequence of processes of a conventional programming process so that it becomes possible to easily form the error detection control system of the second aspect.

In accordance with the error detection control system of the third aspect, since the error detection control means is designed to determine the data type of read-out data based upon an error detection control signal outputted from the memory control means, the determination of the data type can be achieved by using a simple structure so that it becomes possible to easily achieve the error detection control system of the third aspect by using a simple structure.

In accordance with the error detection control system of the fourth aspect, since the error detecting process is permitted to be executed on command data not to be subjected to be the overwriting process, it is possible to ensure data reliability and anti-tampering characteristic with respect to command data in which data alteration by faulty means or the like and data deterioration due to a long-time storage highly possibly cause leakage of secret information and a system run away, and consequently to effectively prevent leakage of secret information and a system run away. Moreover, in accordance with the error detection control system of the fourth aspect, since the execution of the error detecting process is inhibited on program counter where the overwriting process is desirably carried out, it becomes possible to achieve a high processing speed with respect to the program counter.

In accordance with the error detection control system of the fifth aspect, since a flag area corresponding to each of the data areas is provided in the nonvolatile memory, and since an inhibit flag against the error detecting process is set in the flag area in an overwriting process, it becomes possible to easily make a determination as to the availability of the error detecting process on data stored in the main data area, and consequently to easily determine the availability of the error detection process in the error detection control means by using a simple structure. Moreover, in accordance with the error detection control system of the fifth aspect, the inhibit flag against the error detecting process is set in the flag area in an overwriting process; therefore, in the case when redundant data, stored in the redundant data area, becomes no longer applicable to an error detecting process for data stored in the main data area due to an overwriting process, it becomes possible to inhibit the error detecting process.

In accordance with the error detection control system of the sixth aspect, since a register capable of storing the availability of the execution of the error detecting process is provided in each of data areas separately from the nonvolatile memory, and since an inhibit flag against the error detecting process on the data area to be subjected to be the overwriting process is set in an overwriting process, it becomes possible to easily make a determination as to the availability of the error detecting process on data stored in the main data area, and consequently to easily determine the availability of the error detecting process in the error detection control means by using a simple structure. Moreover, in accordance with the error detection control system of the sixth aspect, the inhibit flag against the error detecting process is set in the register in an overwriting process; therefore, even in the case when redundant data, stored in the redundant data area, becomes no longer applicable to an error detecting process for data stored in the main data area due to an overwriting process, it becomes possible to inhibit the error detecting process.

In accordance with the error detection control system of the seventh aspect, since reading processes of plurality of times are executed on data not to be subjected to the error detecting process, and since read-out data are respectively compared so as to determine correct or incorrect thereof, it becomes possible to ensure the data reliability and anti-tampering characteristic also on data not to be subjected to the error detecting process by using redundant data.

In accordance with the error detection control system of the eighth aspect, in the case when redundant data corresponds to data usable for an error correcting process, such as hamming code and the like, since an error correcting process is simultaneously inhibited when the error detecting process is inhibited, it becomes possible also to apply the error detection control system of the present invention to the structure provided with redundant data capable of carrying out not only the error detecting process, but also the error correcting process.

In accordance with the IC card of the aforementioned aspect, since the error detection control system of any one of the first to eighth aspects is installed therein, it is possible to achieve all the functions and effects in the error detection control system in the first aspect. That is, in accordance with the IC card of the aforementioned aspect, it is possible to execute an error detecting process effective from the viewpoints of the data reliability and anti-tampering characteristic on read-out data on which no overwriting process is carried out or no overwriting process has been carried out, and it is also possible to execute an overwriting process effective from the viewpoint of a high-speed processing on read-out data on which an overwriting process is desirably carried out or an overwriting process has been executed; thus, an optimal process can be executed automatically depending on the data types and storage states.

BRIEF DESCRIPTION OF THE DRAWINGS

FIG. 11 is an explanatory view showing an example of a transition of a value in a data area in an error detection control system in accordance with a conventional art.

DESCRIPTION OF REFERENCES

Figure 1:
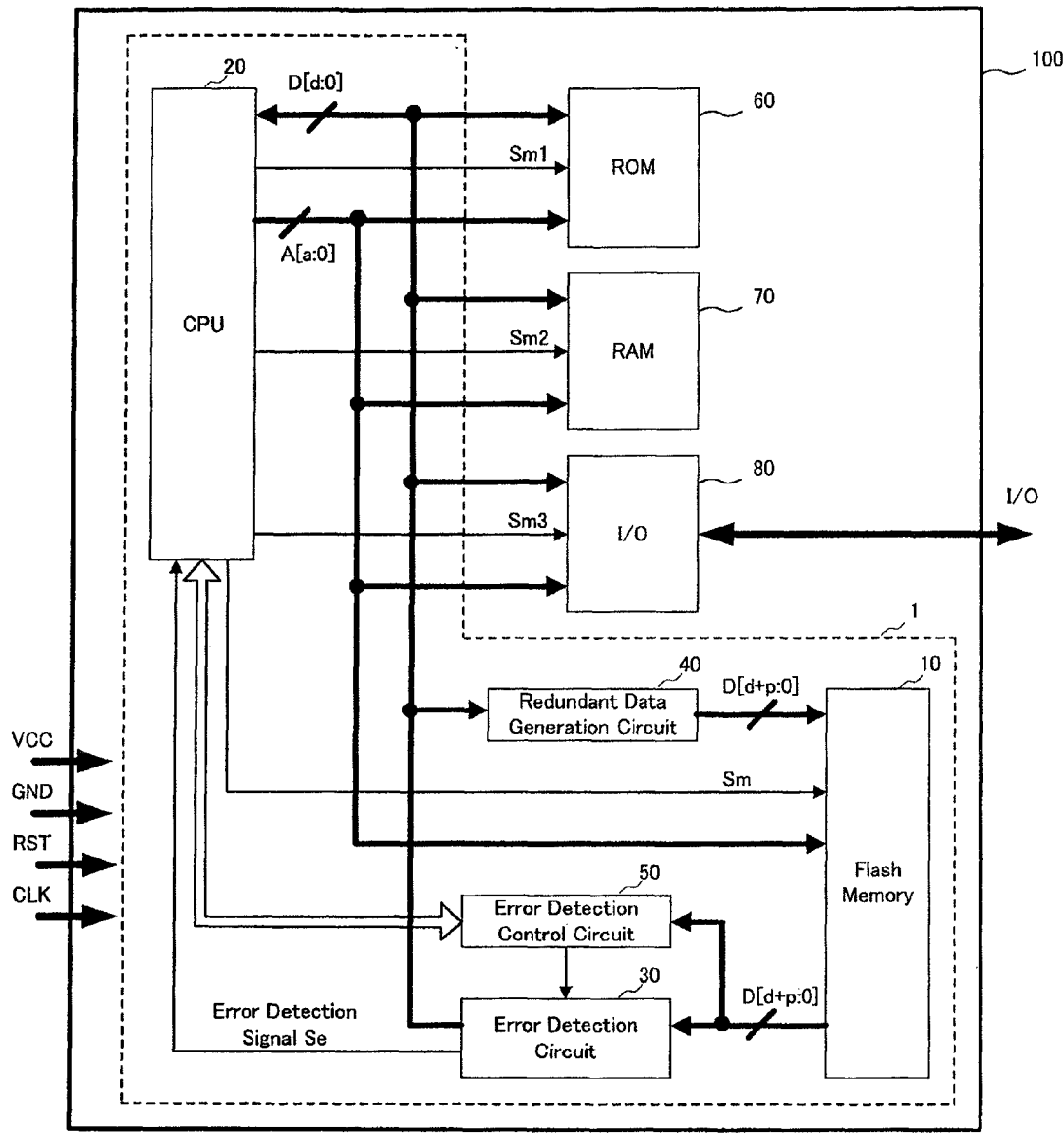
FIG. 1 is a schematic block diagram schematically showing a partial structure of an IC card having an error detection control system in accordance with the present invention installed therein.

1: Error detection control system in accordance with the present invention
10: Flash memory (Nonvolatile memory)
20: CPU (Memory control means)
30: Error detection circuit (Error detection means)
40: Redundant data generation circuit
50: Error detection control circuit (Error detection control means)
60: ROM
70: RAM
80: I/O
90: Control register
100: IC card in accordance with the present invention
Sa: Availability setting signal
Sb: Determination result informing signal
Sc: Error detection control signal
F: Flag signal
Sm: Memory control signal
Sm1: Memory control signal
Sm2: Memory control signal
Sm: Control signal
Smp: Memory control signal
Se: Error detection signal
WF: Area
WD: Data area
WM: Main data area WP: Redundant data area
WS: Status area

BEST MODE FOR CARRYING OUT THE INVENTION

Referring to the drawings, the following description will discuss embodiments of an error detection control system in accordance with the present invention (hereinafter, briefly referred to as "the present inventive system" on demand) and an IC card in accordance with the present invention.

First Embodiment

Referring to FIGS. 1 to 6, the following description will discuss a first embodiment of the present inventive system. In the present embodiment, the explanation is given on the assumption that the present inventive system is installed on an IC card.

Figure 2:
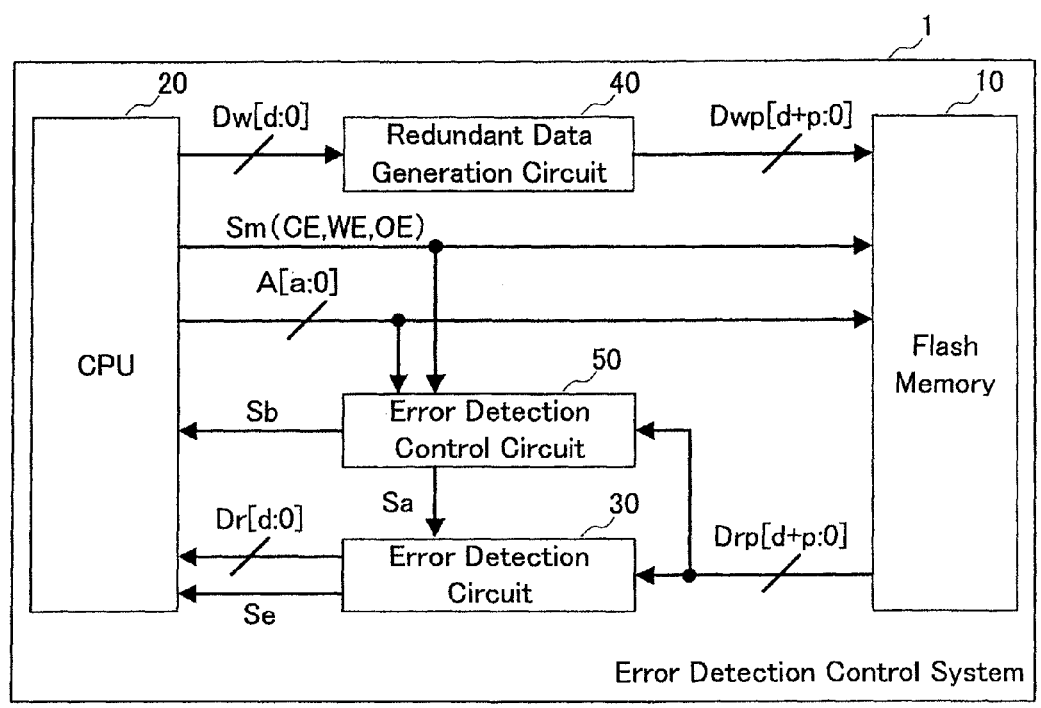
FIG. 2 is a schematic block diagram schematically showing a partial structure of the error detection control system in accordance with a first embodiment of the present invention.

First, referring to FIGS. 1 to 5, the following description will discuss the structures of the present inventive system and IC card of the present embodiment. In this case, FIG. 1 shows a schematic structural example of an IC card 100 on which a present inventive system 1 has been installed, and FIG. 2 shows a schematic structural example of the present inventive system 1 of the present embodiment.

As shown in FIG. 1, the present inventive system 1 of the present embodiment is mounted on the IC card 100, and the IC card 100 is configured by a flash memory 10, a CPU (central processing unit) 20, an error detection circuit 30, a redundant data generation circuit 40 and an error detection control circuit 50 that constitute the present inventive system 1, and is also provided with a ROM (read only memory) 60 in which programs for driving the IC card 100, secret information, such as pass words, electronic certification information and the like, are stored, a RAM (random access memory) 70 in which various data are temporarily stored, and an I/O (input/output interface) 80 used for data communication with external devices. Moreover, as shown in FIG. 1, the CPU 20, the ROM 60, the RAM 70 and the I/O 80 are respectively connected with one another by an address bus that transmits address signals A[a:0] and a data bus that transmits data signals D[a:0]. Moreover, the CPU 20 is designed so that a memory control signal Sm1 is inputted to the ROM 60, a memory control signal Sm2 is inputted to the RAM 70 and a control signal Sm3 is inputted to the I/O 80 respectively therefrom.

As shown in FIG. 2, the present inventive system 1 includes: a flash memory 10 serving as one example of a nonvolatile memory having data areas for a plurality of addresses each configured by a main data area for storing predetermined data and a redundant data area for storing redundant data used in an error detecting process of the data; a CPU 20 (corresponding to memory control means) for controlling on the flash memory 10 a batch erasing process on the data area group basis (block basis) configured by the data areas of the predetermined number of addresses, a reading process on the data area basis, a programming process on the data area basis, and an overwriting process on the main data area after the programming process on a bit basis configuring the main data area; an error detection circuit 30 for executing an error detecting process on read-out data read out by the reading process, based upon the corresponding redundant data; and an error detection control circuit 50 (corresponding to error detecting control means) for controlling the availability of the execution of the error detecting process on the read out data in the error detection circuit 30, based upon data types to be classified depending on whether or not the read-out data is subjected to the overwriting process. The present inventive system 1 of the embodiment is further provided with a redundant data generation circuit 40 that generates redundant data, with respect to programming data that forms a programming object in the programming process.

In the present embodiment, for example, data, such as command codes, secret information and the like, are defined as a data type to be subjected to the error detecting process as not being an execution object of an overwriting process, and data of a program counter or the like to be changed one after another is defined as a data type not to be subjected to the error detecting process as being an execution object of an overwriting process. Moreover, the redundant data of the present embodiment is formed so as to carry out the error detecting process, and in this case, an explanation will be given on the assumption that the data is prepared as parity codes (for example, odd parity) of 1-bit data.

In the present embodiment, the flash memory 10 stores data, such as command data (command codes) and program counter, upon executing a program for realizing functions of the IC card 100. In the present embodiment, the flash memory 10 has data areas each set to one of an error detecting process inhibit data area for storing data with the execution of the error detecting process being inhibited and an error detecting process permit data area for storing data with the execution of the error detecting process being permitted.

Figure 3A:
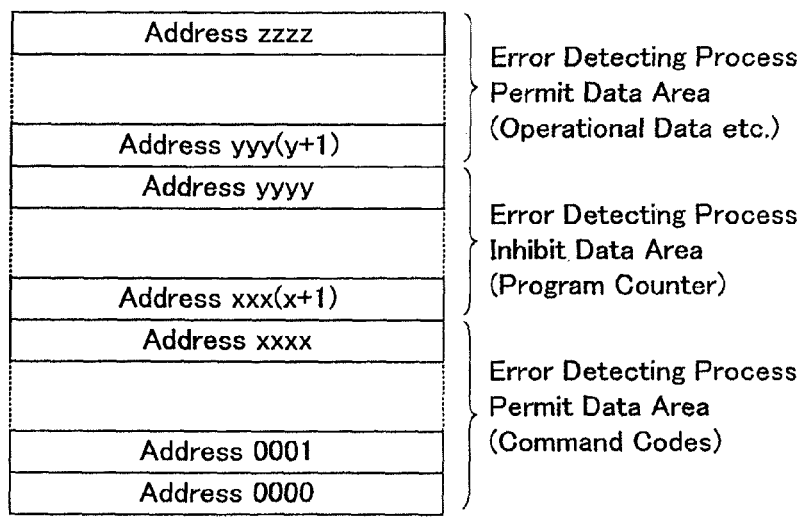
FIG. 3 is a conceptual view showing a structure of a memory area in a nonvolatile memory of the error detection control system in accordance with the first embodiment of the present invention.
Figure 3B:
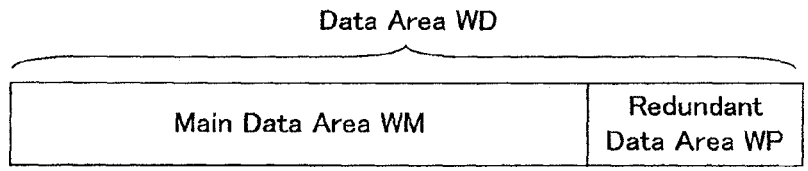

FIG. 3A shows an address map that indicates a schematic structural example of the flash memory 10 and FIG. 3B shows a structural example of a data area WD. More specifically, as shown in FIG. 3A, the flash memory 10 is provided with the data area WD including addresses from '0000' to 'zzzz'. Since addresses from '0000' to 'xxxx' correspond to a data area WD for use in command codes and cannot be the execution object of an overwriting process, these addresses are set to the error detecting process permit data area. Since addresses from 'xxx(x+1)' to 'yyyy' correspond to a data area WD for use in program counter and can be the execution object of an overwriting process, these addresses are set to the error detecting process inhibit data area. Since addresses from 'yyy(y+1)' to 'zzzz' correspond to a data area WD for use in operational data, such as image data used for execution of commands, and cannot be the execution object of an overwriting process, these addresses are set to the error detecting process permit data area. As shown in FIG. 3B, each of the data areas WD is constituted by a main data area WM used for storing data, such as command codes, program counter and operational data, and a redundant data area WP used for storing redundant data.

The CPU 20 carries out controlling processes for respective circuits installed in the IC card 100 so as to realize the respective functions of the IC card 100 having the present inventive system 1 being assembled therein. Moreover, the CPU 20 of the present embodiment carries out controlling processes for a data output for use in setting the availability of the error detecting process to be carried out on a detection control circuit 50 that will be described later, and a batch erasing process, a reading process, a programming process and an overwriting process to be carried out on the flash memory 10, as functions of the present inventive system 1.

As shown in FIG. 2, the CPU 20 in the present embodiment is designed to output an address signal A [a:0] (in which "a" represents a value of the most significant bit of the address signal A) to be inputted to the flash memory 10 and a memory control signal Sm composed of a chip enable signal CE, a programming enable signal WE, an output enable signal OE and the like, to the detection control circuit 50 to be described later, as data for use in setting the availability of the error detecting process. In the present embodiment, the address signal A [a:0] and the memory control signal Sm for controlling the flash memory 10 are utilized as data for use in setting the availability of the error detecting process; however, not limited to this structure, other data may be utilized, or exclusively-used data may be utilized.

Upon controlling the flash memory 10, for example, in a batch erasing process, the CPU 20 carries out an erasing process on the block basis by programming a block erasing command in the command-use inside register in the flash memory 10. Moreover, for example, in the programming process and overwriting process, the CPU 20 brings the chip enable signal CE and the programming enable signal WE into active states, and outputs the address signal A [a:0] indicating the address of the data area WD to be subjected to the programming process to the flash memory 10, and outputs a data signal Dw[d:0] (in which d corresponds to a value of the most significant bit of the data signal) of the programming data to a redundant data generation circuit 40, which will be described later. Moreover, for example, in a reading process, the CPU 20 brings the chip enable signal CE and the output enable signal OE into active states, and outputs the address signal A [a:0] indicating the address of the data area WD to be subjected to the reading process, and receives the data signal Dr[d:0] of the reading data and an error detection signal Se from an error detecting circuit 30. The respective signals are outputted at timings in accordance with the specifications in the flash memory 10.

Figure 4:
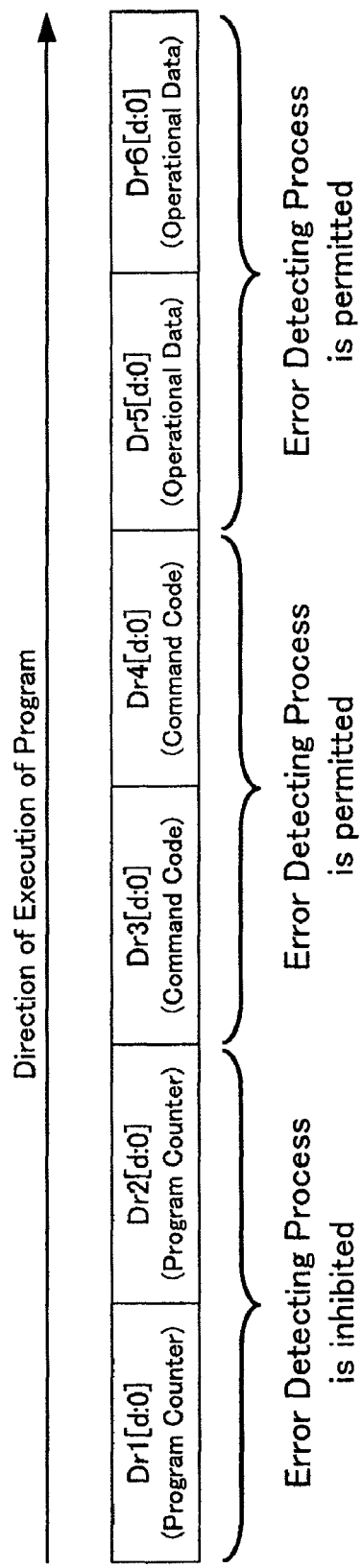
FIG. 4 is a conceptual view showing an example of read-out data upon execution of a program in the error detection control system in accordance with the present invention.

FIG. 4 shows an example of read-out data to be read out by a sequence of reading processes carried out on the flash memory 10 when the CPU 20 executes a driving program for the IC card 100. In this case, an explanation will be given on the assumption that the data length of the main data area WM of each data area WD is 8 bits and that a command code having a data length of 16 bits is stored by using two data areas WD. In the same manner, an explanation will be given on the assumption that the data length of the program counter is 16 bits and that the data length of operational data is 8 bits or 16 bits.

As shown in FIG. 4, the CPU 20 first executes a reading process on the flash memory 10 so as to acquire an address of the data area WD in which the command code is stored, and a program counter composed of Dr1[d:0] and Dr2[d:0] is obtained. In this case, one of Dr1[d:0] and Dr2[d:0] corresponds to the upper 8 bits of the program counter, and the other corresponds to the lower 8 bits thereof.

Next, the CPU 20 reads a command code composed of Dr3[d:0] and Dr4[d:0] from the data area WD of the address indicated by the program counter and the data area WD of the next address. One of Dr3[d:0] and Dr4[d:0] corresponds to the upper 8 bits of the command code and the other corresponds to the lower 8 bits thereof. After reading out the command code, the CPU 20 carries out an overwriting process on the data area WD of the program counter of the flash memory 10 so as to be updated, in order to increase the value of the address indicated by the program counter (in this case, since it is assumed that the CPU 20 executes a command code having a data length of 16 bits, the value of the address is increased by 2).

Successively, the CPU 20 decodes the read-out command code, and executes a reading process so as to read out operational data to be used for executing the command so that operational data composed of Dr5[d:0] and Dr6[d:0] is acquired. One of Dr5[d:0] and Dr6[d:0] corresponds to the upper 8 bits of the operational data and the other corresponds to the lower 8 bits thereof. The CPU 20 executes the command by using the operational data composed of Dr5[d:0] and Dr6[d:0], and programs the results thereof in a predetermined data area WD of the flash memory 10. In the same manner, the CPU 20 successively controls the program execution.

In the present embodiment, the present inventive system 1 is designed so that, among the read-out data read in the sequence of reading processes shown in FIG. 4, the execution of the error detecting process is inhibited with respect to Dr1[d:0] and Dr2[d:0] that are the values of the program counter, and the execution of the error detecting process is permitted with respect to Dr3[d:0] and Dr4[d:0] that correspond to command codes and Dr5[d:0] and Dr6[d:0] that correspond to operational data.

Figure 5:
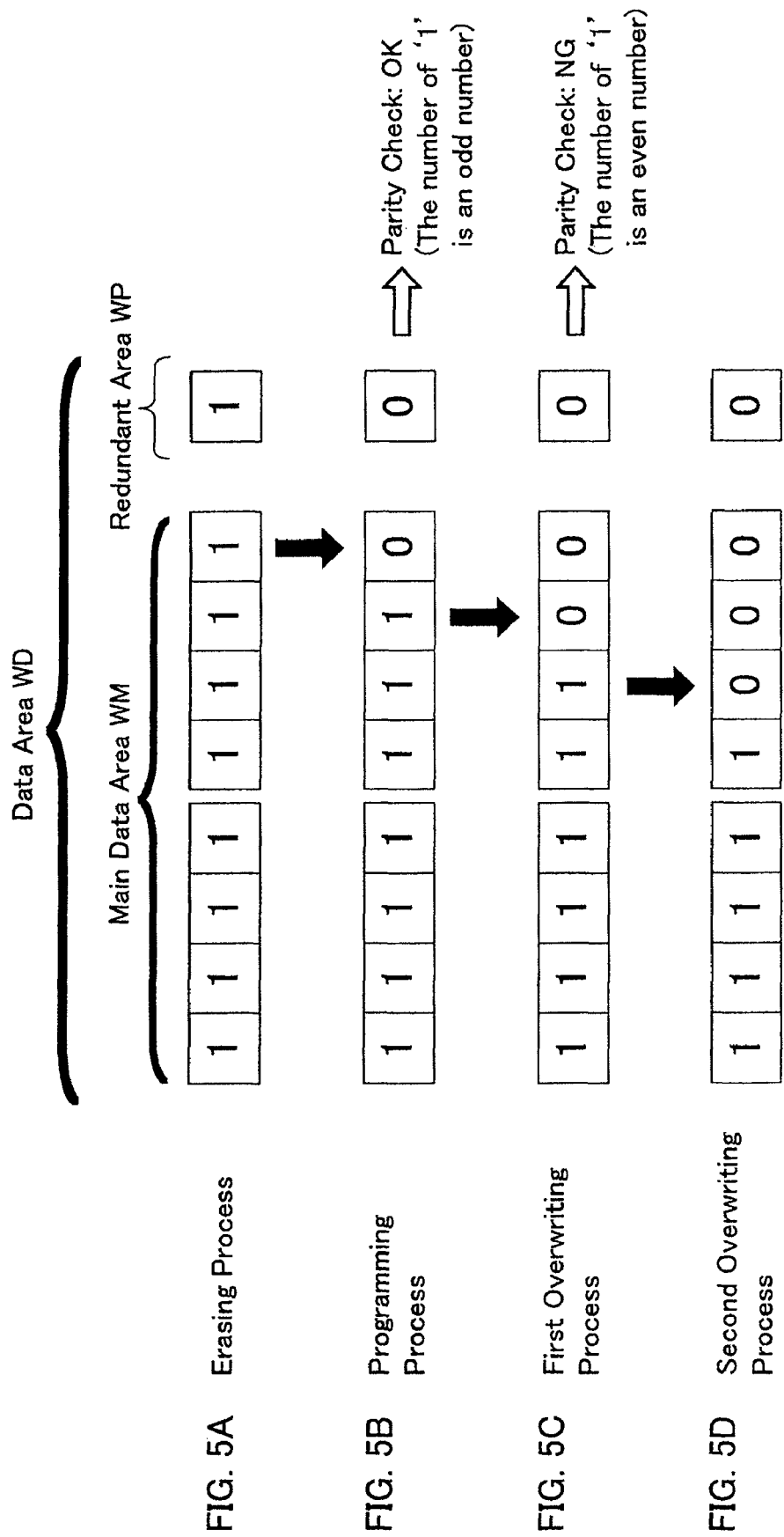
FIG. 5 is a schematic conceptual view showing an example of a transition of a program counter value in the error detection control system in accordance with the present invention.

In this case, FIG. 5 shows an example of a change in the program counter value stored in the flash memory 10. In FIG. 5, for convenience of explanation, under the condition that the data length of the main data area WM of each data area WD is 8 bits and that the data length of the program counter is 16 bits, the data area WD corresponding to the lower 8 bits is shown.

In the present embodiment, as shown in FIG. 5A, all the values of respective bits of the data area WD for the program counter become '1' after the erasing process. Upon occurrence of a request for updating the program counter shown in FIG. 5 due to the program execution, the CPU 20 carries out a programming process for programming data '1111 1110' in the main data area WM of the program counter. Moreover, redundant data '0' (odd parity) corresponding to the data '1111 1110' stored in the main data area WM after the programming process is generated by a redundant data generation circuit 40 to be described later so that the redundant data '0' is programmed in the redundant data area WP in the data area WD of the program counter.

When a request for updating the program counter is further generated by the execution of the program, the CPU 20 carries out an overwriting process for changing the value of 1 bit in the main data area WM of the program counter from '1' to '0'. More specifically, data '1111 1110' of the main data area WM shown in FIG. 5B are overwritten by data '1111 1101' or data '1111 1100'. By this overwriting process, as shown in FIG. 5C, the main data area WM of the program counter becomes '1111 1100'. The redundant data corresponding to the data '1111 1100' of the main data area WM shown in FIG. 5C is '1'; however, since no programming process from '0' to '1' is executed on the bit basis, due to the principle of the flash memory 10, the redundant data after the overwriting process becomes '0'. This indicates that, with respect to the program counter and redundant data thereof after the overwriting process, no error detecting process can be executed correctly.

In the same manner, upon further occurrence of a request for updating the program counter, the CPU 20 carries out an overwriting process for changing the value of 1 bit in the main data area WM of the program counter from '1' to '0'. More specifically, data '1111 1100' of the main data area WM shown in FIG. 5C are overwritten by data '1111 1011', data '1111 1001' or data '1111 1000'. By this overwriting process, as shown in FIG. 5D, the main data area WM of the program counter becomes '1111 1000'.

Moreover, for correct/incorrect determination with respect to error detection inhibit data in which the execution of the error detecting process is inhibited by the error detection control circuit 50, the CPU 20 of the present embodiment is designed to further execute read-out processes on the error detection inhibit data a predetermined number of times after the reading process of the error detection inhibit data.

When the CPU 20 carries out a reading process, the error detection circuit 30 executes an error detecting process on the read-out data based upon the corresponding redundant data, in the case when the error detecting process of the read-out data is permitted by a detection control circuit 50 to be described later.

More specifically, in the present embodiment, since one-bit data (odd parity) has been assumed for parity check as the redundant data, the error detection circuit 30 determines that the read-out data is correct in the case when the number of '1's is an odd number in the entire data areas WD including the main data area WM and the redundant data area WP, that is, in the case when the number of '1's contained in a data signal Drp[d+1:0] is an odd number, with respect to a data signal Drp[d+p:0] (in which "p" represents the number of bits of the redundant data, and is 1 in this case) outputted from the flash memory 10.

Moreover, in the case when the error detecting process for the read-out data is permitted, after the execution of the error detecting process on the read-out data, and in the case when the error detecting process for the read-out data is inhibited, after the read-out data has been read, the error detection circuit 30 outputs a data signal Dr[d:0] in the main data area WM inside the read-out data Drp[d+p:0] and an error detection signal Se. The error detection signal Se in this case is set to '1' upon determination that the read-out data in the error detecting process is not correct, and is also set to '0' in the other cases.

When the CPU 20 executes a reading process, in the case when a reading object data area which is the data area WD to be subjected to the reading process corresponds to an error detecting process inhibit data area, the error detection control circuit 50 inhibits the execution of the error detecting process in the error detection circuit 30, while in the case when the reading object data area corresponds to an error detecting process permit data area, it permits the error detecting process by the error detection circuit 30. Moreover, the detection control circuit 50 also outputs an availability setting signal Sa indicating the availability of the error detecting process to the error detection circuit 30.

In the present embodiment, more specifically, based upon the value of an address signal A[a:0] outputted from the CPU 20 and an address map shown in FIG. 3, the error detection control circuit 50 determines which area the read-out object data area corresponds to, the error detecting process inhibit data area or the error detecting process permit data area. In the case when the address signal A[a:0] indicates addresses from '0000' to 'xxxx' or addresses from 'yyy(y+1)' to 'zzzz', it is determined that the area corresponds to the error detecting process permit data area, while in the case when the address signal indicates addresses from 'xxx(x+1)' to 'yyyy', it is determined that the area corresponds to the error detecting process inhibit data area. When the read-out object data area corresponds to the error detecting process permit data area, the value of the availability setting signal Sa is set to '0', and when it corresponds to the error detecting process inhibit data area, the value of the availability setting signal Sa is set to '1'.

Moreover, the error detection control circuit 50 of the present embodiment carries out a correct/incorrect determining process on the error detection inhibit data in which the execution of the error detecting process is inhibited. More specifically, the error detection control circuit 50 compares a predetermined number of error detection inhibit data read out by the CPU 20 with one another, and determines whether the read-out data is correct or incorrect.

When the CPU 20 carries out a programming process, the redundant data generation circuit 40 receives the programming data Dw[d:0] from the CPU 20, generates redundant data based upon the programming data Dw[d:0], and outputs data Dwp[d+p:0] formed by adding redundant data to the programming data Dw[d:0] to the flash memory 10. More specifically, in the present embodiment, the redundant data is a 1-bit data (odd parity) for use in parity check, and the value is set so that the number of 1's is an odd number in the entire data area WD.

Figure 6:
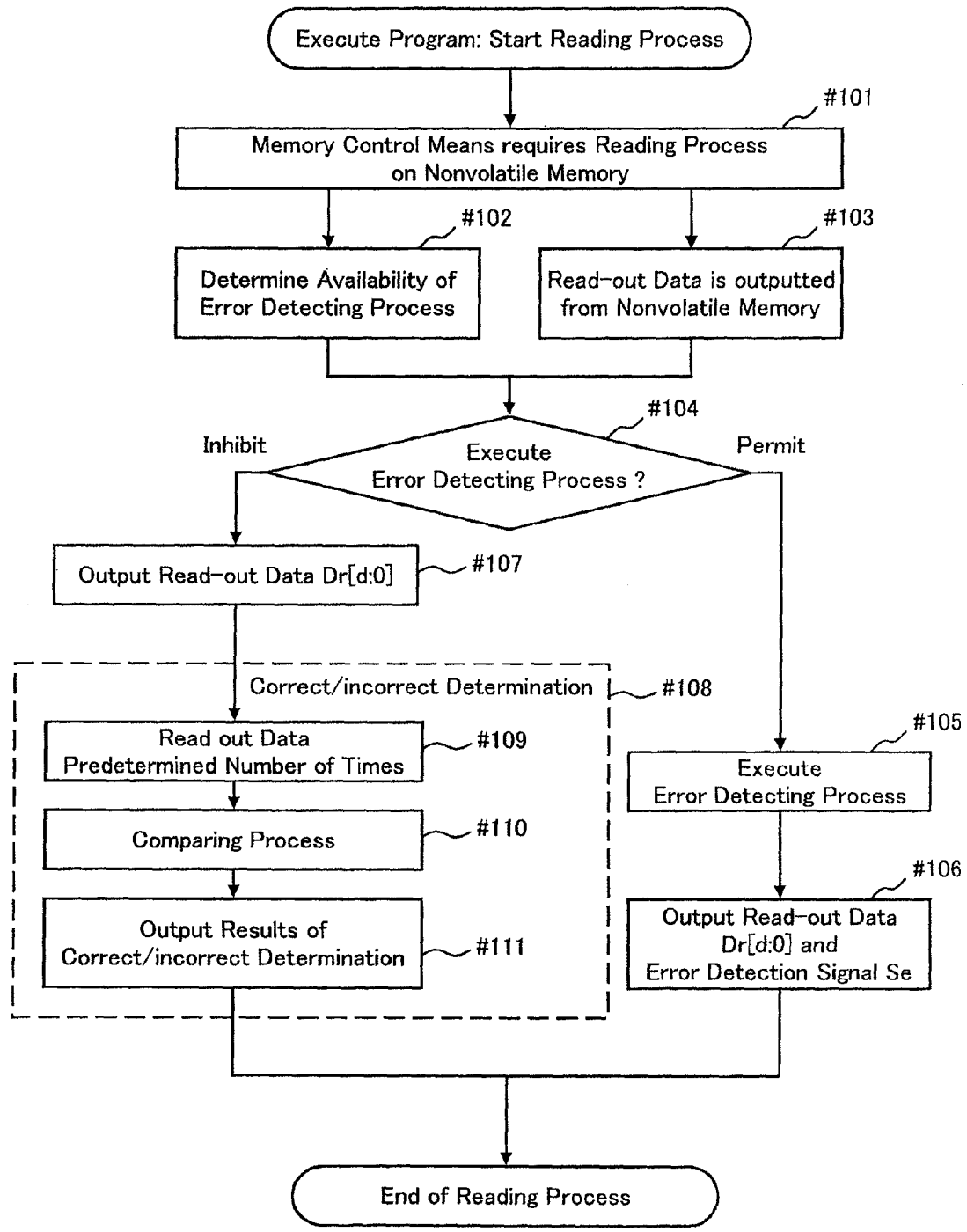
FIG. 6 is a flow chart showing a sequence of processes in the error detection control system in accordance with the first embodiment of the present invention.

Next, referring to FIG. 6, among the processing operations of the present inventive system 1 of the present embodiment, a processing operation for the control of the error detecting process is briefly explained.

When the CPU 20 executes a program, and a read-out request on the flash memory 10 is generated (step #101), the error detection control circuit 50 sets the availability of the error detecting process (step #102). More specifically, the error detection control circuit 50 determines that the execution of a read-out process is started when both of the chip enable signal CE and the output enable signal OE have been brought into an active state, and, based upon the value of an address signal A[a:0] outputted from the CPU 20 at this time and the address map shown in FIG. 3, determines which area the read-out object data area corresponds to, the error detecting process inhibit data area or the error detecting process permit data area, so that the availability of the error detecting process is determined and the availability setting signal Sa is outputted to the error detection circuit 30.

The error detection circuit 30 receives the availability setting signal Sa outputted from the error detection control circuit 50 (step #102), and upon receipt of data Drp[d+p:0] read out from the flash memory 10 (step #103), determines whether the error detecting process is permitted or inhibited based upon the availability setting signal Sa (step #104).

In the present embodiment, in step #104, the error detection circuit 30 determines that the error detecting process is permitted in the case of '0' of the availability setting signal Sa ('permit' branch in step #104) so that the error detecting process is carried out on the data Drp[d+p:0] (step #105). In this case, the error detecting process corresponds to a parity check process, so that, in the case when the number of bits having the value of '1' is an odd number in the entire data Drp[d+p:0], the data Drp[d+p:0] is determined to be correct. Upon determination that the data Drp[d+p:0] is correct, the value of the error detection signal Se is set to '0', while, upon determination that the data is not correct, the value of the error detection signal Se is set to '1'. The error detection circuit 30 outputs the error detection signal Se to the CPU 20 together with data Dr[d:0] obtained by excluding the redundant data from the data Drp[d+p:0] (step #106).

In step #104, in the case when the availability setting signal Sa is '1', the error detection circuit 30 determines that the error detecting process is inhibited ("inhibit" branch in step #104), and outputs data Dr[d:0] formed by excluding the redundant data from the data Drp[d+p:0] to the CPU 20 without carrying out the error detecting process (step #107). In this case, the value of the error detection signal Se is set to '0'. Moreover, at this time, the error detection control circuit 50 carries out a correct/incorrect determining process on the data Drp[d+p:0] (step #108). In the present embodiment, the CPU 20 executes a reading process for reading the same error detection inhibit data from the flash memory 10 again so as to carry out the correct/incorrect determining process on the error detection inhibit data (step #109) The error detection control circuit 50 compares two error detection inhibit data derived from the reading processes of two times, and in the case when the two data are equal to each other, determines that the error detection inhibit data Drp[d+p:0] is correct, while in the case when the two data are different from each other, determines that the error detection inhibit data Drp[d+ p:0] is incorrect (step #110). Moreover, the error detection control circuit 50 informs the CPU 20 of the results of the correct/incorrect determination on the error detection inhibit data by using a determination result informing signal Sb (step #111).

When the read-out data Dr[d:0] is determined to be incorrect by the error detecting process in the error detection circuit 30, or when the error detection inhibit data Dr[d:0] is determined to be incorrect by the correct/incorrect determining process in the error detection control circuit 50, the CPU 20 cancels the data Dr[d:0]. Moreover, in the present embodiment, in the case when it is determined that an unfair operation or the like is executed, that is, in such a case that the data Dr[d:0] is continuously determined to be incorrect more than a fixed number of times, the CPU 20 resets the system of the IC card 100.

In the present embodiment, the correct/incorrect determining process of step #108 is carried out on the error detection inhibit data on which the error detecting process is inhibited; however, the correct/incorrect determining process in step #108 may be carried out on demand. Therefore, for example, in such a case when the degree of importance of the error detection inhibit data is low, the data Dr[d:0] formed by excluding the redundant data from the data Drp[d+p:0] may be outputted to the CPU 20, without executing the correct/incorrect determining process.

Second Embodiment

Figure 7:
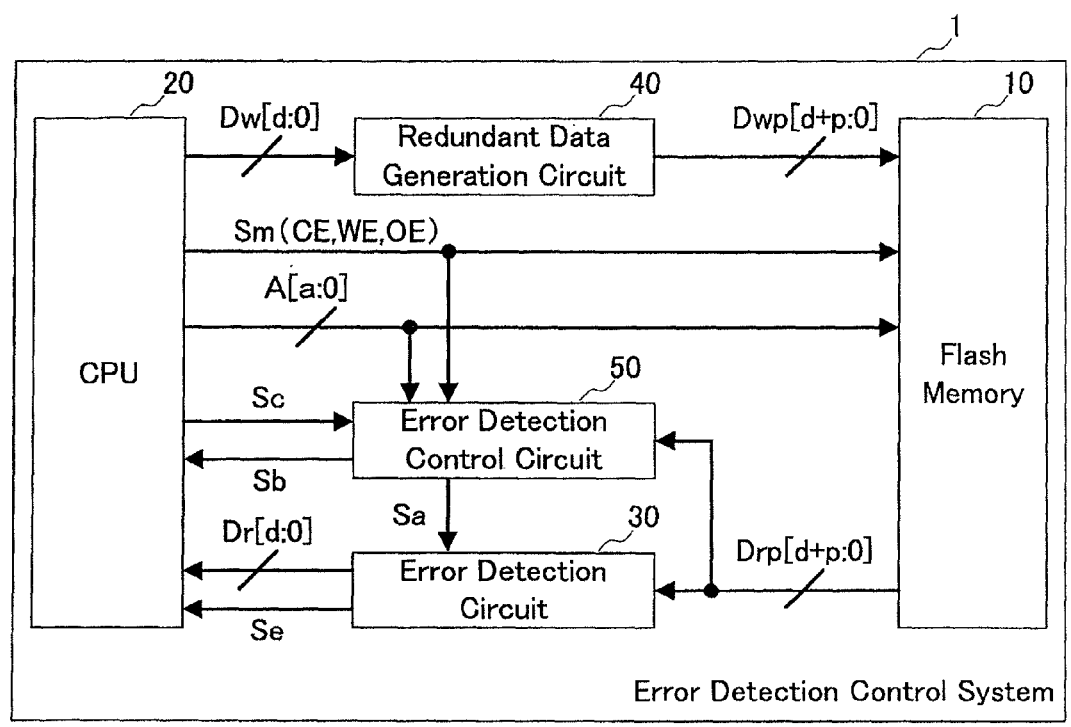
FIG. 7 is a schematic block diagram schematically showing a partial structure of an error detection control system in accordance with a second embodiment of the present invention.

Referring to FIG. 7, the following description will discuss the present inventive system 1 in accordance with the second embodiment. The present embodiment differs from the first embodiment in that the determining method for the data type of read-out data is made different. More specifically, in the first embodiment, the data type is determined based upon the address map of the flash memory 10; however, in the present embodiment, the data type is determined based upon an error detection control signal Sc from the CPU 20.

Referring to FIG. 7, the following description will discuss the structure of the present inventive system 1 in accordance with the present embodiment. As shown in FIG. 7, the present inventive system 1 in accordance with the present embodiment is configured by a flash memory 10, a CPU 20, an error detection circuit 30, a redundant data generation circuit 40 and an error detection control circuit 50, and the structures of the flash memory 10, the error detection circuit 30 and the redundant data generation circuit 40 are the same as those of the first embodiment.

As shown in FIG. 7, the CPU 20 of the present embodiment is designed so that, upon carrying out a reading process, it outputs an error detection control signal Sc in accordance with the data type of read-out data obtained in the reading process to the error detection control circuit 50. In this case, the error detection control signal Sc is generated by using a command fetch signal that indicates the timing for command fetching.

During the reading process, the error detection control circuit 50 of the present embodiment determines whether or not the data type of the read-out data corresponds to a data type that allows an overwriting process to be executed thereon, based upon the error detection control signal Sc, and in the case when the data type is such a data type as not to allow an overwriting process to be executed thereon, it allows the error detection circuit 30 to carry out an error detecting process thereon, while in the case when the data type is such a data type as to allow an overwriting process to be executed thereon, it inhibits the error detecting process by the error detection circuit 30. More specifically, in the present embodiment, when the error detection control signal Sc (command fetch signal) is in an active state, it is determined that the reading process relates to a command code that cannot be subjected to the overwriting process so that the error detection circuit 30 is permitted to carry out the error detecting process. Moreover, when the error detection control signal Sc is in an inactive state, it is determined that the read-out data is error detection inhibit data that can be subjected to the overwriting process so that the error detection circuit 30 is inhibited to carry out the error detecting process.

In the present embodiment, it is assumed that the error detection control signal Sc is a command fetch signal; however, this may be a data lead signal. In this case, in the case when the data lead signal is in an active state, the error detection control circuit 50 inhibits the error detecting process by the error detection circuit 30, while in the case when the data lead signal is in an inactive state, it permits the error detecting process by the error detection circuit 30. Moreover, the error detection control signal Sc may be formed by combining a command fetch signal and a data lead signal with each other. In this case, in the case when the error detection control signal Sc is a signal that indicates that the read-out data corresponds to a command code, the error detection control circuit 50 permits the execution of the error detecting process, while in the case when the error detection control signal Sc is a signal that indicates that the read-out data corresponds to a program counter value, it inhibits the execution of the error detecting process.

Third Embodiment

Figure 8:
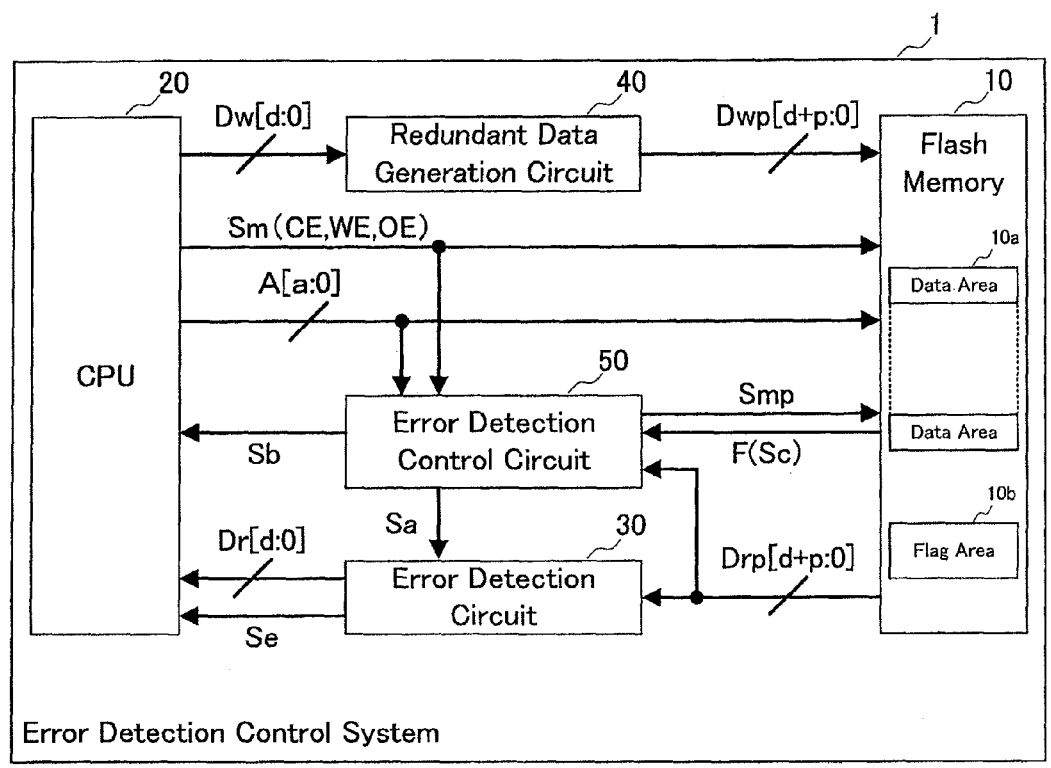
FIG. 8 is a schematic block diagram schematically showing a partial structure of an error detection control system in accordance with a third embodiment of the present invention.

Referring to FIG. 8, the following description will discuss the present inventive system 1 in accordance with the third embodiment. In the present embodiment, an explanation will be given to a system in which the setting method of the availability of the error detecting process is different from those of the first and second embodiments. More specifically, in the first and second embodiment, the availability of the execution of the error detecting process is set based upon the data type of the read-out data; however, the availability of the execution of the error detecting process is set based upon a storage state that indicates whether an overwriting process has been executed or not.

Referring to FIG. 8, the following description will discuss the structure of the present inventive system 1 in accordance with the present embodiment. As shown in FIG. 8, the present inventive system 1 in the present embodiment is configured by a flash memory 10, a CPU 20, an error detection circuit 30, a redundant data generation circuit 40 and an error detection control circuit 50, and the structures of the error detection circuit 30 and the redundant data generation circuit 40 are the same as those of the first embodiment.

In the present embodiment, as shown in FIG. 8, the flash memory 10 is provided with a flag area for storing the availability of the execution of the error detecting process for each data area WD. Upon executing a batch erasing process on the block basis, the flash memory 10 automatically initializes the corresponding flag area to set its value to '1'. That is, in the case when the initial state of the flag area is '1', it is determined that an overwriting process is not executed, and in the case when the flag area is '0', it is determined that the overwriting process has been executed. Moreover, the flash memory 10 of the present embodiment is designed so that, upon executing a reading process, it outputs a flag signal F indicating the value of the flag area corresponding to a data area WD to be subjected to the reading process to the error detection control circuit 50, as an error detection control signal Sc.

The error detection control circuit 50 of the present embodiment is designed to control the availability of the execution of the error detecting process on the read-out data in the error detection circuit 30, based upon the storage state indicating whether or not the overwriting process has been executed. More specifically, in a reading process, in the case when the flag signal F is '1', the error detection control circuit 50 determines that the overwriting process has not been executed, and allows the error detection circuit 30 to execute the error detecting process, while, in the case when the flag signal F is '0', it determines that the overwriting process has been executed, and inhibits the error detection circuit 30 from executing the error detecting process.

When the CPU 20 carries out an overwriting process, the error detection control circuit 50 sets an execution inhibit flag of the error detecting process in a flag area corresponding to the data area WD to be subjected to the overwriting process. More specifically, in the overwriting process, the error detection control circuit 50 programs '0' in the flag area corresponding to the data area WD indicated by an address signal A[a:0].

Fourth Embodiment

Figure 9:
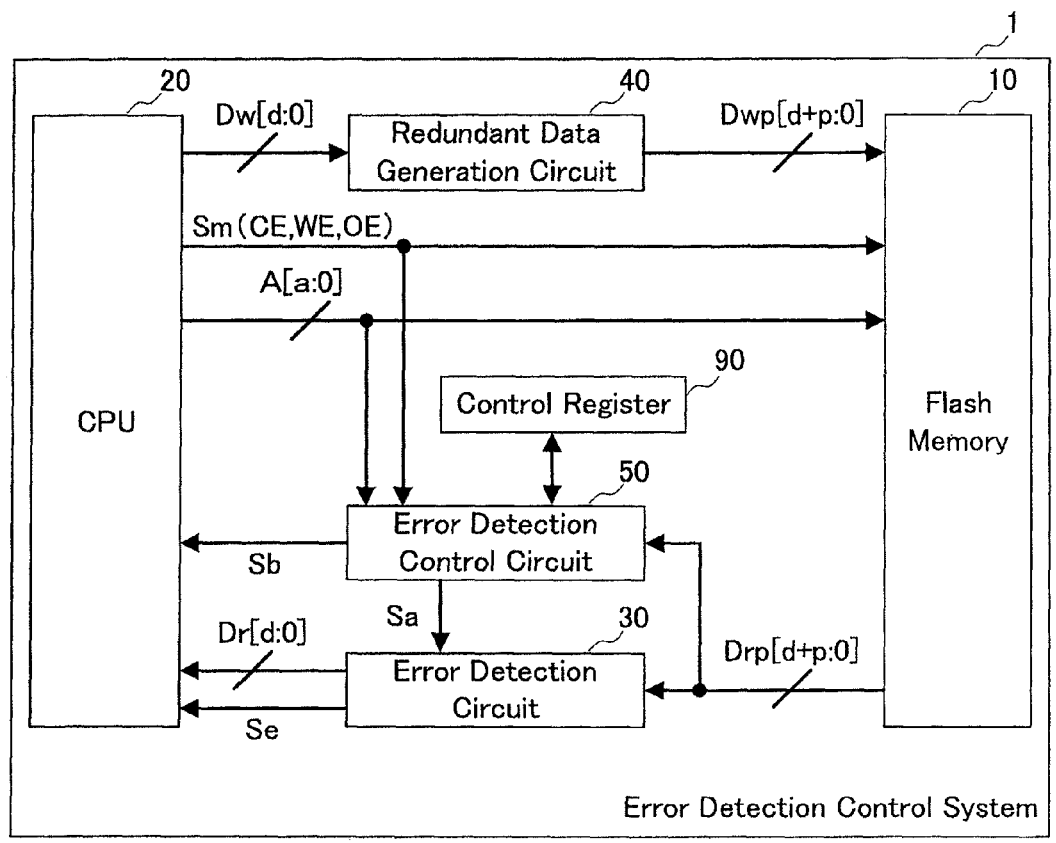
FIG. 9 is a schematic block diagram schematically showing a partial structure of an error detection control system in accordance with a fourth embodiment of the present invention.

Referring to FIG. 9, the following description will discuss the present inventive system 1 in accordance with the fourth embodiment. The present embodiment differs from the third embodiment in that the determining method for the storage state of read-out data is made different. More specifically, in the third embodiment, the storage state is determined by utilizing the flag area in the flash memory 10; however, in the present embodiment, the determination of the storage state is carried out by utilizing a control register 90 that is provided in the present inventive system 1 separately from the flash memory 10.

Referring to FIG. 9, the following description will discuss the structure of the present inventive system 1 in accordance with the present embodiment. As shown in FIG. 7, the present inventive system 1 in the present embodiment is configured by a flash memory 10, a CPU 20, an error detection circuit 30, a redundant data generation circuit 40 and an error detection control circuit 50, and the structures of the flash memory 10, the error detection circuit 30 and the redundant data generation circuit 40 are the same as those of the first embodiment.

The present inventive system 1 is provided with a control register 90 capable of storing the availability of the execution of an error detecting process for each of the data areas WD. In the present embodiment, the control register 90 is provided with an execution inhibit flag setting area for each of the data areas WD, and in the case when no overwriting process has been executed thereon (initial state), the value of the execution inhibit flag setting area is set to '1', and in the case when an overwriting process has been executed thereon, the value of the execution inhibit flag setting area is set to '0'.

The error detection control circuit 50 of the present embodiment is designed so that, based upon the storage state indicating whether or not the overwriting process has been executed, it controls the availability of the execution of the error detecting process on read-out data in the error detection circuit 30. More specifically, in a reading process, the error detection control circuit 50 of the present embodiment refers to the control register 90, and in the case when no execution inhibit flag is set in the data area WD to be subjected to the reading process, that is, in the case when the value of the corresponding execution inhibit flag setting area is '1', it allows the error detection circuit 30 to execute the error detecting process. Moreover, in the case when the execution inhibit flag is set in the data area WD to be subjected to the reading process, that is, in the case when the value of the corresponding execution inhibit flag setting area is '0', it inhibits the error detection circuit 30 from executing the error detecting process.

Moreover, when the CPU 20 carries out an overwriting process, the error detection control circuit 50 of the present embodiment sets an execution inhibit flag for the error detecting process on the data area WD to be subjected to the overwriting process, in the control register 90. More specifically, the error detection control circuit 50 programs '0' in the corresponding execution inhibit flag setting area of the control register 90.

Other Embodiments (1) In the first to fourth embodiments, explanations have been given by exemplifying a structure provided with the flash memory 10; however, the present invention is not intended to be limited by this. For example, in the case of a nonvolatile memory in which, on principle, no change is made from a programming state to an erasing state on the bit basis, the present inventive system 1 is effectively used. A batch erasing process, a reading process, a programming process and an overwriting process by the CPU 20 are carried out by controlling the respective signals in accordance with the specifications of the nonvolatile memory.

(2) In the first to fourth embodiments, explanations have been given by exemplifying a structure in which the redundant data corresponds to 1-bit data for use in parity check capable of executing an error detecting process; however, the present invention is not intended to be limited by this. For example, another error detection code, such as checksum, capable of executing the error detecting process, may be used, or an error detection and correction code, such as a hamming code capable of executing an error correcting process together with an error detecting process, may be used.

Figure 10:
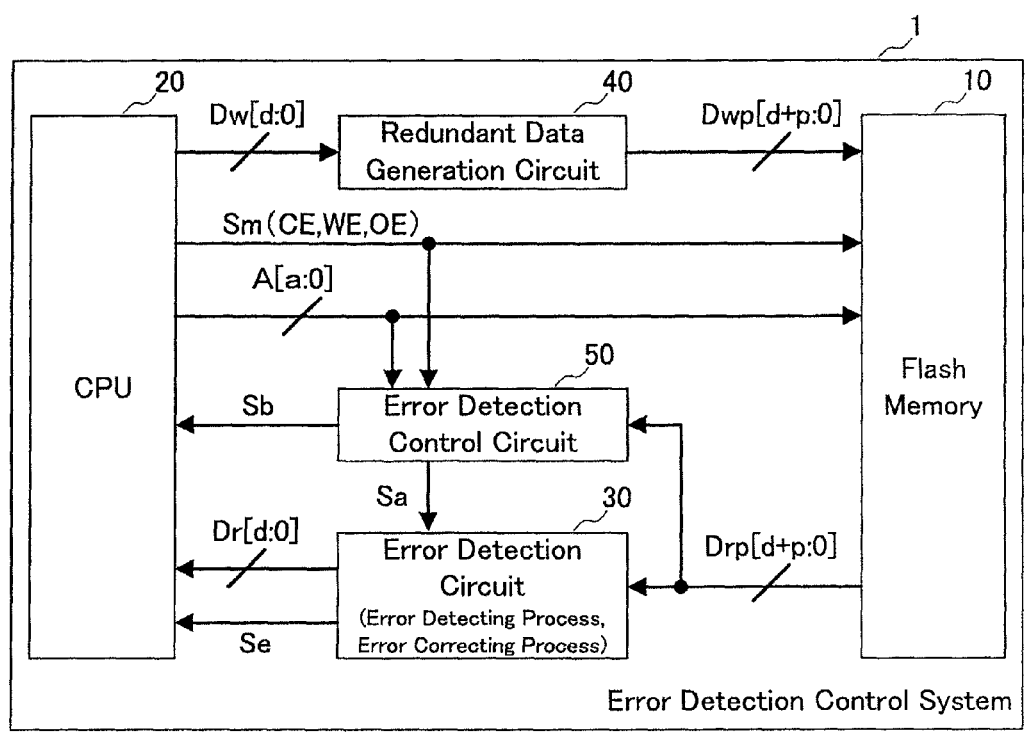
FIG. 10 is a schematic block diagram schematically showing a partial structure of an error detection control system in accordance with another embodiment of the present invention.

FIG. 10 shows a schematic partial structure of the present inventive system 1 in the case of being capable of executing an error correcting process together with an error detecting process in the error detection circuit 30. In this case, the error detection control circuit 50 inhibits the error correcting process, in the case of inhibiting the execution of the error detecting process. In the case when both of the error detecting process and error correcting process are permitted by the error detection control circuit 50, the error detection circuit 30 executes error detecting process and error correcting process on the read-out data based upon the corresponding redundant data.

(3) In the first to fourth embodiments, the reading process is again carried out on the error detection inhibit data as a correct/incorrect determination process on the error detection inhibit data with the error detecting process being inhibited so that two error detection inhibit data are compared with each other; however, the present invention is not intended to be limited by the above. For example, in the case when the two error detection inhibit data are different from each other, the error detection inhibit data may be read out for an arbitrary number of times so as to be subjected to the comparing processes. Moreover, in reading processes for a plurality of times, in the case when the number of non-coincident data exceeds a fixed determination ratio, or in the case when the number of coincident data is a fixed determination ratio or less, it may be determined that the error detection inhibit data is not correct. The number of reading processes and the determination ratio of data are set depending on the degree of importance of the error detection inhibit data.

Moreover, in the first and fourth embodiments, the comparison process including a plurality of reading processes, is executed as the correct/incorrect determining process for the error detection inhibit data; however, another method may be used, or a plurality of methods may be used in combination depending on the degree of importance of the error detection inhibit data. Moreover, with respect to read-out data other than the error detection inhibit data, when the degree of importance thereof is high, the comparison process may be executed by use of reading processes of a plurality of times.

The invention claimed is:

1. An error detection control system comprising:
a nonvolatile memory having data areas for a plurality of addresses, the data areas each including a main data area for storing predetermined data and a redundant data area for storing redundant data to be used in an error detecting process on the data;
memory control means for controlling on the nonvolatile memory a batch erasing process on a data area group basis, the data area group including the data areas of a predetermined number of addresses, a reading process on the data area basis, a programming process on the data area basis, and an overwriting process on the main data area after the programming process on a bit basis, the bit constituting the main data area;
error detecting means for executing the error detecting process on read-out data in the reading process, based upon the corresponding redundant data; and
error detecting control means for controlling availability of execution of the error detecting process on the read-out data by the error detecting means, based upon data types to be classified depending on whether or not the read-out data is subjected to the overwriting process or a storage state indicating whether or not the overwriting process has been executed.

2. The error detection control system according to claim 1, wherein
the nonvolatile memory is configured such that each of the data areas is set to an error detection process inhibit data area for storing the data on which the execution of the error detecting process is inhibited or an error detection process permit data area for storing the data on which the execution of the error detecting process is permitted, and
the error detecting control means inhibits the error detection means from executing the error detecting process during the reading process when a reading object data area to be subjected to the reading process corresponds to the error detecting process inhibit data area, and permits the error detection means to execute the error detecting process during the reading process when the reading object data area corresponds to the error detecting process permit data area.

3. The error detection control system according to claim 1, wherein
the memory control means outputs an error detection control signal to the error detection control means in the reading process in accordance with the data type of the read-out data in the reading process,
the error detection control means determines whether or not the data type of the read-out data corresponds to a data type allowing the overwriting process to be executed based upon the error detection control signal in the reading process, permits the error detection means to execute the error detecting process when the data type corresponds to a data type not allowing the overwriting process to be executed, and inhibits the error detection means from executing the error detecting process when the data type corresponds to a data type allowing the overwriting process to be executed, and
the error detection means executes the error detecting process on the read-out data by using the corresponding redundant data when the execution of the error detecting process on the read-out data is permitted by the error detection control means.

4. The error detection control system according to claim 3, wherein
when the error detection control signal is a signal indicating that the read-out data corresponds to command data, the error detection control means permits the execution of the error detecting process, and
when the error detection control signal is a signal indicating that the read-out data corresponds to a program counter value, the error detection control means inhibits the execution of the error detecting process.

5. The error detection control system according to claim 1, wherein
the nonvolatile memory comprises a flag area for storing the availability of the execution of the error detecting process for each of the data areas, and
the error detection control means sets an execution inhibit flag for the error detecting process in the flag area corresponding to the data area to be subjected to be the overwriting process when the memory control means carries out the overwriting process.

6. The error detection control system according to claim 1 further comprising
a register configured to store the availability of the execution of the error detecting process for each of the data areas outside the nonvolatile memory, wherein
the error detection control means sets in the register an execution inhibit flag for the error detecting process on the data area to be subjected to be the overwriting process when the memory control means carries out the overwriting process.

7. The error detection control system according to claim 1, wherein
the memory control means carries out the reading process on an error detection inhibit data on which the execution of the error detecting process is inhibited, and then further carries out the reading process on the error detection inhibit data a predetermined number of times, and
the error detection control means compares respective read-out data in the reading process and determines whether the read-out data is correct or incorrect.

8. The error detection control system according to claim 1, wherein
the redundant data is designed to be applicable to an error correcting process in addition to the error detecting process,
the error detection means executes the error detecting process and the error correcting process on the read-out data based upon the corresponding redundant data, and
the error detection control means inhibits execution of the error correcting process when it inhibits the execution of the error detecting process.

9. An IC card comprising
an IC chip in which the error detection control system according to claim 1 is installed.

* * * * *